United States Patent
Yang et al.

(10) Patent No.: US 10,360,433 B2
(45) Date of Patent: Jul. 23, 2019

(54) HEART RATE DETECTION METHOD AND APPARATUS FINGERPRINT IDENTIFICATION APPARATUS AND MOBILE TERMINAL

(71) Applicant: SHENZHEN GOODIX TECHNOLOGY CO., LTD., Shenzhen (CN)

(72) Inventors: Wangwang Yang, Shenzhen (CN); Yi He, Shenzhen (CN); Yudong Wang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 133 days.

(21) Appl. No.: 15/655,885

(22) Filed: Jul. 21, 2017

(65) Prior Publication Data

US 2017/0316252 A1 Nov. 2, 2017

Related U.S. Application Data

(63) Continuation of application No. PCT/CN2016/090836, filed on Jul. 21, 2016.

(30) Foreign Application Priority Data

Dec. 31, 2015 (CN) .......................... 2015 1 1027232

(51) Int. Cl.
*G06K 9/20* (2006.01)
*G06K 9/00* (2006.01)
(Continued)

(52) U.S. Cl.
CPC ........... *G06K 9/00087* (2013.01); *G06K 9/00* (2013.01); *G06K 9/0004* (2013.01); *G06F 21/32* (2013.01);
(Continued)

(58) Field of Classification Search
CPC .......... G06K 9/00006–9/0012; G06K 9/00107
See application file for complete search history.

(56) References Cited

U.S. PATENT DOCUMENTS 9,129,143 B2* 9/2015 Shie ...................... G06K 9/0002
2006/0115128 A1* 6/2006 Mainguet ........... G06K 9/00026
382/115
(Continued)

FOREIGN PATENT DOCUMENTS

CN 105046239 A 11/2015
CN 105046240 A 11/2015
(Continued)

OTHER PUBLICATIONS

English machine translation of CN105069438A, dated Nov. 18, 2015, pp. 1-7. (Year: 2015).*

*Primary Examiner* — Brian Werner

(57) ABSTRACT

A fingerprint identification apparatus and a mobile terminal are disclosed. The fingerprint identification apparatus includes a fingerprint sensor and an optical module electrically connected to the fingerprint sensor. The optical module comprises an optical emitter, an optical circuit module and a photoelectric converter; wherein the optical circuit module is electrically connected to the optical emitter and the photoelectric converter respectively; the optical emitter is configured to emit an optical signal having a specific wavelength; the photoelectric converter is configured to receive the optical signal emitted by the optical emitter and subjected to a touch object, and convert the optical signal into an electric signal; and the optical circuit module is configured to drive and control the optical emitter, and analyze the electric signal.

18 Claims, 16 Drawing Sheets

(51) Int. Cl.
*G06F 21/32* (2013.01)
*H04W 12/06* (2009.01)

(52) U.S. Cl.
CPC ..... *G06F 2221/2133* (2013.01); *H04W 12/06* (2013.01)

(56) References Cited

U.S. PATENT DOCUMENTS

| | | |
|---|---|---|
| 2007/0253606 A1 | 11/2007 | Higuchi |
| 2010/0148068 A1* | 6/2010 | Schwaneberg ....... G06K 9/0012 250/338.4 |
| 2015/0146944 A1 | 5/2015 | Pi et al. |
| 2017/0024601 A1* | 1/2017 | Lin ................... G06K 9/00013 |

FOREIGN PATENT DOCUMENTS

| | | |
|---|---|---|
| CN | 105069438 A | 11/2015 |
| CN | 204883744 U | 12/2015 |
| CN | 204926122 U | 12/2015 |
| CN | 205486158 U | 8/2016 |
| EP | 1353292 A1 | 10/2003 |
| JP | 2008036058 A | 2/2008 |

\* cited by examiner

HEART RATE DETECTION METHOD AND APPARATUS FINGERPRINT IDENTIFICATION APPARATUS AND MOBILE TERMINAL

CROSS-REFERENCE TO RELATED APPLICATIONS

This application is a continuation of international application No. PCT/CN2016/090836, filed on Jul. 21, 2016, which claims priority to Chinese Patent Application No. 201511027232.7, filed before Chinese Patent Office on Dec. 31, 2015, both of which are incorporated herein by reference in their entities.

TECHNICAL FIELD

The present application relates to the technical field of fingerprint identification, and in particular, relates to a fingerprint identification apparatus and a mobile terminal.

BACKGROUND

With improvement of smartness of mobile terminals, functionality of the mobile terminals is becoming diversified, and people may advertise and share information by using social networking software, pick up pictures, browse webpages and even make online payment over the mobile terminals. Accordingly, more and more private information and sensitive information of users are stored on the mobile terminals. In this case, security of the mobile terminals is highly concerned by people.

Since fingerprints are important biological characteristics of human bodies and are unique, fingerprint identification apparatuses are widely applied to the mobile terminals at present, which are mainly used for terminal unlocking, file encryption, secure payment and the like functions. However, conventional fingerprint identification apparatuses may only compare collected fingerprint information and pre-stored fingerprint information to judge whether the collected fingerprint information matches the pre-stored fingerprint information, but fail to judge whether the collected fingerprint information is an authentic fingerprint or a spoof fingerprint. Therefore, the conventional fingerprint identification apparatuses are subject to a risk of being cracked by a spoof fingerprint, and thus the security of the mobile terminals is low.

SUMMARY

One technical problem to be solved by the present application is to provide a fingerprint identification apparatus and a mobile terminal, which are intended to lower the risk that the fingerprint identification apparatus is cracked by a spoof fingerprint, and improve the security.

The present application provides a fingerprint identification apparatus, including a fingerprint sensor, and further including an optical module electrically connected to the fingerprint sensor, wherein the optical module includes an optical emitter, an optical circuit module and a photoelectric converter; wherein the optical circuit module is electrically connected to the optical emitter and the photoelectric converter respectively;

the optical emitter is configured to emit an optical signal having a specific wavelength;

the photoelectric converter is configured to receive the optical signal emitted by the optical emitter and subjected to a touch object, and convert the optical signal into an electric signal; and the optical circuit module is configured to drive and control the optical emitter, and analyze the electric signal.

Specifically, the optical circuit module and the fingerprint sensor are integrated on a chip, the chip being a fingerprint chip, wherein the chip is a fingerprint chip.

Specifically, the fingerprint sensor is independently integrated on a chip, and the optical circuit module is electrically connected to the fingerprint sensor via a data interface, wherein the chip is a fingerprint chip.

Specifically, the optical circuit module, the photoelectric converter and the fingerprint sensor are integrated on a chip, wherein the chip is a fingerprint chip.

The present application further provides a mobile terminal. The mobile terminal includes a fingerprint identification apparatus. The fingerprint identification apparatus includes a fingerprint sensor and an optical module electrically connected to the fingerprint sensor, wherein the optical module includes an optical emitter, an optical circuit module and a photoelectric converter; wherein the optical circuit module is electrically connected to the optical emitter and the photoelectric converter respectively;

the optical emitter is configured to emit an optical signal having a specific wavelength;

the photoelectric converter is configured to receive the optical signal emitted by the optical emitter and subjected to a touch object, and convert the optical signal into an electric signal; and the optical circuit module is configured to drive and control the optical emitter, and analyze the electric signal.

In the fingerprint identification apparatus according to the present application, the optical module and the fingerprint sensor are integrated on the fingerprint identification apparatus, when the touch object (for example, a finger) touches the fingerprint sensor, such a touch also acts on an optical emitter and the photoelectric converter of the optical module. In this way, a fingerprint signal and an optical signal of the finger are may be simultaneously collected, which implements the live body detection function (that is, determining whether the detected object is an authentic fingerprint), lowers the risk that the fingerprint identification apparatus is cracked by a spoof fingerprint, and improves the security.

In addition, the optical module may also implement such functions as heart rate detection, touch pressure detection, key detection, blood oxygen detection, blood pressure monitoring and the like, and thus extends functionality of the mobile terminal. According to the present application, the optical module is integrated in the fingerprint identification apparatus to implement such functions as heart rate detection and the like. As compared with the mobile terminal in which a heart rate identification module is independently disposed to detect the heart rate, the design according to the present application has the advantages of simple structure, low cost and convenient use.

BRIEF DESCRIPTION OF THE DRAWINGS

To more clearly describe technical solutions according to the embodiments of the present application or in the prior art, drawings that are to be referred for description of the embodiments or the prior art are briefly described hereinafter. Apparently, the drawings described hereinafter merely illustrate some embodiments of the present application.

Persons of ordinary skill in the art may also derive other drawings based on the drawings described herein without any creative effort.

REFERENCE NUMERALS AND DENOTATIONS THEREOF

Figure 1:
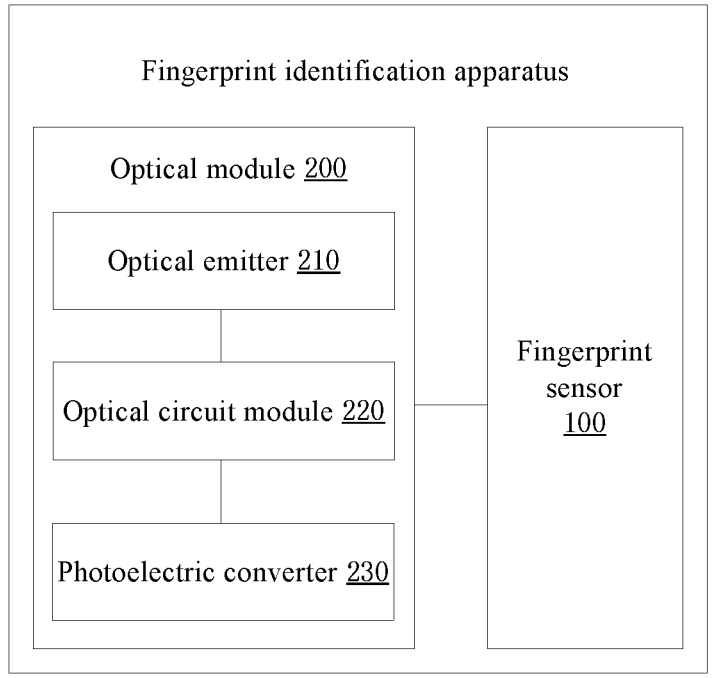
FIG. 1 is a schematic diagram of modules of a fingerprint identification apparatus according to the present application.

100—Fingerprint sensor
200—Optical module
210—Optical emitter
220—Optical circuit module
221—Current driver
222—Control circuit
223—Current voltage conversion circuit and common mode suppression circuit
224—Programmable gain amplifier
225—Analog-to-digital converter
226—Data analysis and processing unit
230—Photoelectric converter
300—Cover plate
400—Circuit board
500—Metal ring
600—Light shading member
700—Glue
10—Fingerprint package
11—Fingerprint chip
12—Substrate
13—Bonding wire
14—Protection layer
101—Touch object 102—Fingerprint identification apparatus The attainment of the objectives, functional features and advantages of the present application are further described hereinafter with reference to the specific embodiments and the accompanying drawings.

DETAILED DESCRIPTION

To make the objectives, technical features, and advantages of the present application apparent and more understandable, the technical solutions according to the embodiments of the present application are further described in detail with reference to the accompany drawings. Apparently, the embodiments described herein are merely some exemplary ones, rather than all the embodiments of the present application. Based on the embodiments of the present application, all other embodiments derived by persons of ordinary skill in the art without any creative efforts shall fall within the protection scope of the present application.

The disclosure hereinafter provides many different embodiments or examples to practice different structures of the present application. For simplification of the disclosure of the present application, parts and settings in specific examples are described hereinafter. Nevertheless, these examples are only intended to illustrate the present application, instead of limiting the present application. In addition, in the present application, reference numerals and/or letters may be repeatedly used in different examples. Such repetitions are intended to achieve simplification and clarity, and do not denote a relationship between the discussed embodiments and/or settings. Further, the present application provides examples of various specific processes and materials. However, persons of ordinary skill in the art would note that other processes and/or other materials are also applicable.

It should be understood that the specific embodiments described herein are only intended to explain the present application instead of limiting the present application.

Referring to FIG. 1, the present application provides a fingerprint identification apparatus, which is applied to a terminal device, for example, a mobile phone, a tablet computer or the like, or applied to other non-mobile terminal devices. The apparatus includes a fingerprint sensor 100 and an optical module 200, wherein the fingerprint sensor 100 is electrically connected to the optical module 200. The fingerprint sensor 100 is configured to perform fingerprint detection and identification, and has the functions of fingerprint registration, fingerprint detection, fingerprint matching and the like. Practice of the fingerprint sensor is similar to that in the prior art, which is thus not described herein any further. The optical module 200 is configured to implement such functions as heart rate detection, touch pressure detection, key detection, blood oxygen detection, blood pressure monitoring and the like. Especially, the optical module 200 may cooperate with the fingerprint sensor 100, to implement live body detection function, that is, to determine whether the fingerprint identification apparatus is practically pressed by a real fingerprint of a target user, so as to lower the risk that the fingerprint identification apparatus is cracked by a spoof fingerprint.

As illustrated in FIG. 1, the optical module 20 includes an optical emitter 210, an optical circuit module 220 and a photoelectric converter 230, wherein the optical circuit module 220 is electrically connected to the optical emitter 210 and the photoelectric converter 230 respectively.

The optical emitter 210 is configured to emit a light signal having a specific wavelength, and is an emitter part of the optical module 200. The optical module 200 may include one or a plurality of optical emitters which are controlled and driven by the optical circuit module 220.

The optical emitter 210 may be a light-emitting diode (LED), a semiconductor laser (LD) or the like component, which is additionally configured in the fingerprint identification apparatus, or may be a light emitter originally equipped on a terminal device, for example, a display, a breathing light, a flash light or the like. The optical emitter may be in a bare chip form (for example, a wafer) or a package form, or may be used with a specific optical structure, for example, a spotlight cup, an optical grating or the like structure. The optical emitter 210 may be packaged together with the fingerprint sensor 100, or may be an independent device which is independently arranged in the fingerprint identification apparatus.

The photoelectric converter 230 is configured to receive the optical signal, which is emitted by the optical emitter 210 and then subjected to a touch object (by reflection, scattering, projection or the like), and convert the optical signal into an electric signal; wherein a rear end of the photoelectric converter is connected to the optical circuit module 220. The photoelectric converter 230 is capable of sensing light strength, detecting a light strength change of the light emitted by the optical emitter 210, and analyzing and processing such light strength change by using the optical circuit module 220 to implement the corresponding function. The photoelectric converter 230 may employ a photo diode (PD).

The photoelectric converter 230 may be integrated with the fingerprint sensor 100, or may be an independent device which is packaged together with the fingerprint sensor 100 to form a fingerprint package, or may be independently arranged on the fingerprint identification apparatus. The touch object is an object in touch with the fingerprint identification apparatus, which is generally a finger of a user or may be other parts of a human body, for example, toes or the like. With respect to the optical signal subjected to the effect of the touch object, that is, when the finger or the like touch object presses the fingerprint identification apparatus, the light emitted by the optical emitter 210 penetrates through the touch object and is then reflected or scattered to the photoelectric converter 230, or directly reflected or scattered by the touch object to the photoelectric converter 230. The photoelectric converter 230 receives the optical signal reflected or scattered by the touch object.

The optical circuit module 220 is configured to drive and control the optical emitter 210, analyze and process the electric signal converted by the photoelectric converter 230, including, integration, amplification and common mode removal and the like; the optical circuit module 220 is also configured to analyze finally collected data (for example, data sampled by the ADC) according to different application functions. Specifically, the optical circuit module 220 further control working sequence and working state of the entire optical module 200, and further includes a data interface connected to an external module (for example, the fingerprint sensor 100).

The optical circuit module 220 and the fingerprint sensor 100 may be integrated on a chip, or may be an independent circuit module which is assembled in the fingerprint identification apparatus.

Figure 2:
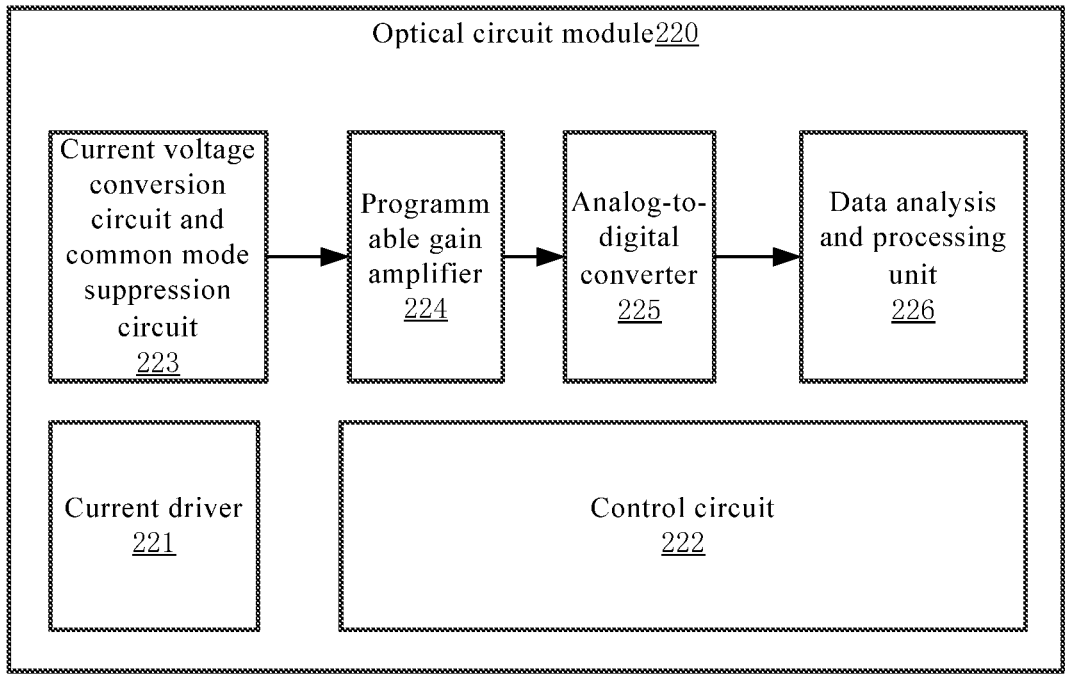
FIG. 2 is a schematic diagram of modules in an optical circuit module according to an embodiment of the present application.

Circuits implementing functions of the optical module 200 are integrated in the optical circuit module 220, including a control circuit, an analog circuit, a data analysis and processing unit, and the like. FIG. 2 schematically illustrates modules in the optical circuit module 220 according to an embodiment of the present application. The optical circuit module 220 includes a current driver 221, a control circuit 222, a current voltage conversion circuit and common mode suppression circuit 223, a programmable gain amplifier (PGA) 224, an analog-to-digital converter (ADC) 225 and a data analysis and processing unit 226. The current driver 221 is configured to drive the optical emitter 210. The control circuit 222 is configured to control the optical emitter 210 to emit an optical signal having a specific wavelength. The current voltage conversion circuit and common mode suppression circuit 223 and the PGA 224 are configured to conduct a series of processing for the electric signal converted by the photoelectric converter 230 (including integration, common mode removal, amplification and the like). The ADC 225 is configured to convert an analog signal to a digital signal. The data analysis and processing unit 226 is configured to analyze and process the finally collected data according to different application functions, to implement such functions of heart rate detection, touch pressure detection, key detection, blood oxygen monitoring and the like.

According to the present application, the optical module 200 and the fingerprint sensor 100 are integrated in the fingerprint identification apparatus, when the touch object (for example, a finger) touches the fingerprint sensor 100, such a touch also acts on the optical emitter 210 and the photoelectric converter 230 of the optical module. In this way, a fingerprint signal and an optical signal of the finger are may be simultaneously collected, which implements the live body detection function (that is, determining whether the detected object is an authentic fingerprint), lowers the risk that the fingerprint identification apparatus is cracked by a spoof fingerprint.

In addition, the optical module 200 may also implement such functions as heart rate detection, touch pressure detection, key detection, blood oxygen detection, blood pressure monitoring and the like, and thus extends functionality of the mobile terminal. According to the present application, the optical module 200 is integrated in the fingerprint identification apparatus to implement such functions as heart rate detection and the like. As compared with the mobile terminal in which a heart rate identification module is independently disposed to detect the heart rate, the design according to the present application has the advantages of simple structure, low cost and convenient use.

In the present application, the fingerprint sensor 100 and the optical module 200 may be deployed in a variety of manners; and the optical circuit module 220, the optical emitter 210, the photoelectric converter 230 and the fingerprint sensor 100 may form an integrated chip or an integrated package based on any combination thereof according to the actual needs, or may be independently present as the parts of the fingerprint identification apparatus. Hereinafter, the structure and deployment of the fingerprint sensor 100 and the optical module 200 in the fingerprint identification apparatus are described in detail with reference to specific embodiments.

Figure 3:
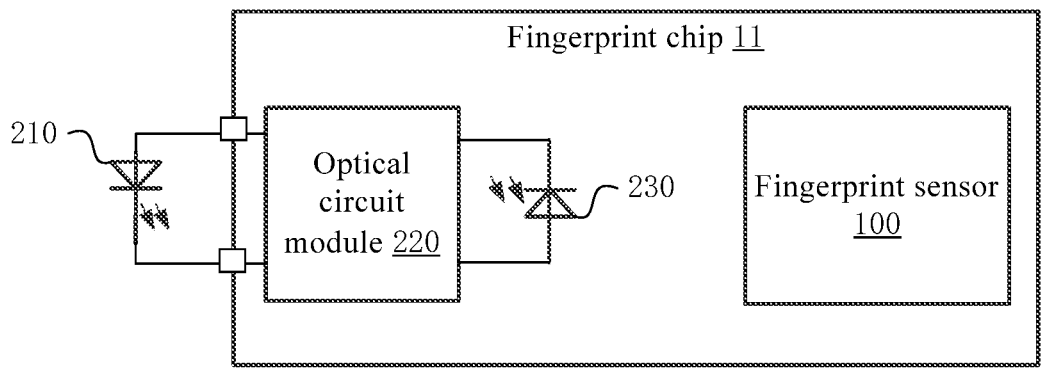
FIG. 3 is a diagram of circuit integration of a fingerprint identification apparatus according to a first embodiment of the present application.

As illustrated in FIG. 3, in this embodiment, the optical circuit module 220, the photoelectric converter 230 and the fingerprint sensor 100 are integrated on a chip, wherein the chip is referred to as a fingerprint chip 11; and the optical emitter 210 is an independent device, wherein one or a plurality of such optical emitters may be used. The fingerprint chip 11 may be packaged together with the optical emitter 210 to form a fingerprint package; alternatively, the fingerprint chip 11 may be independently packaged to a form a fingerprint package, and the optical emitter 210 is disposed outside the fingerprint package.

Figure 4:
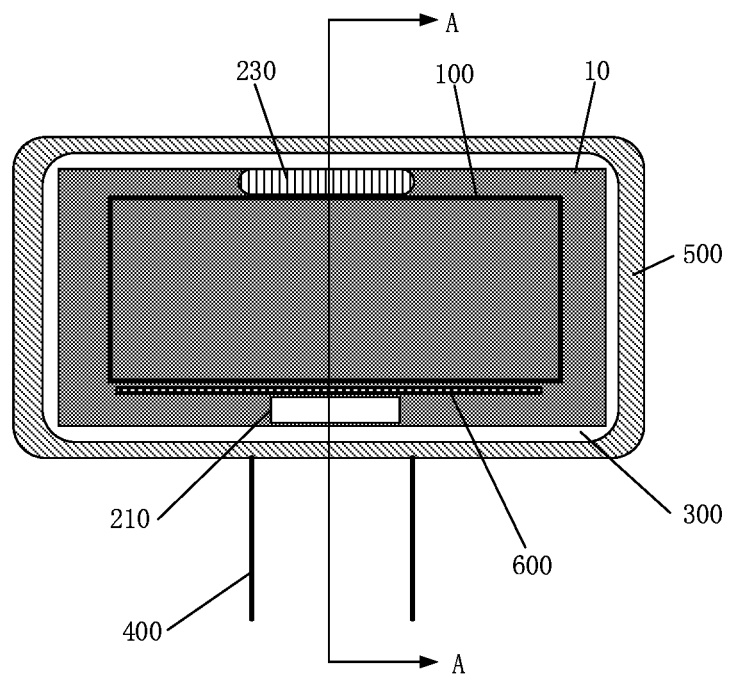
FIG. 4 is a structural diagram of the fingerprint identification apparatus according to the first embodiment of the present application.
Figure 5:
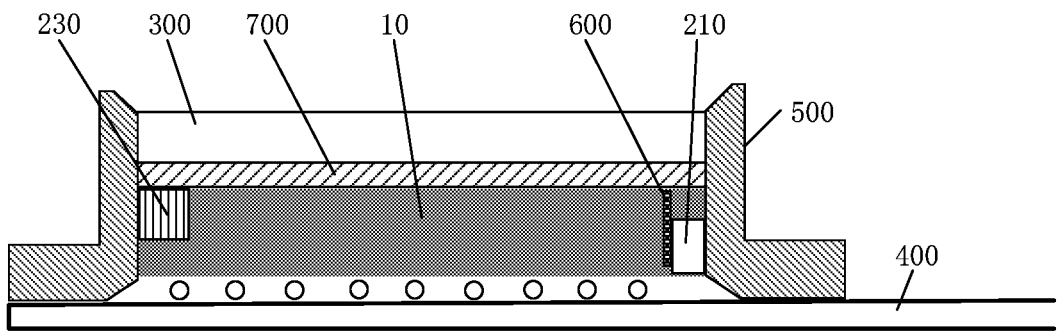
FIG. 5 is a cross-sectional view of the fingerprint identification apparatus in FIG. 4, taken from line A-A.

FIG. 4 and FIG. 5 illustrate a first implementation of the identification apparatus in this embodiment. FIG. 4 is a plan view, and FIG. 5 is an cross-sectional view of FIG. 4 taken from line A-A (the subsequent sectional views are all sectional views taken along line A-A, which are not described herein any further for brevity). In this implementation, the fingerprint chip 11 is packaged together with the optical emitter 210 to form a fingerprint package 10; the fingerprint identification apparatus includes the fingerprint package 10, a cover plate 300, a metal ring 500 and a circuit board 400. The fingerprint package 10 is formed by packaging the fingerprint chip 11 and the optical emitter 11. The cover plate 300 has a high transmission rate for the light emitted by the optical emitter 210; a greater transmission rate of the cover plate 300 is preferred. It is basically required that the cover plate 300 is light transmittable at least in a region corresponding to upper portions of the photoelectric converter 230 and the optical emitter 210; or the entire cover plate 300 may also be made to be light transmittable. The cover plate 300 may be made to be light transmittable by means of coating, laser micropore, coating ink capable of transmitting light waves having a specific wavelength and the like technique. The cover plate 300 is fixed to the fingerprint package 10 by using a glue 700; the glue 700 needs to have a higher transmission rate for the light emitted by the optical emitter 210, and a greater transmission rate of the glue 700 is also preferred, which is preferably greater than 50%. The cover plate 300 and the fingerprint package 10 are both disposed inside the metal ring 500; the metal ring 500 is not a mandatory part in the present application, which may not be used in other embodiments. The circuit board 400 bears the fingerprint package 10, the cover plate 300 and the metal ring 500; the circuit board 400 is an applicable circuit including a chip, and is electrically connected to a peripheral device, an external circuit and the like, which may be a flexible printed circuit (FPC), a flexible flat cable (FFC), a printed circuit board (PCB), a flexible-rigid hybrid board, or the like.

Figure 6:
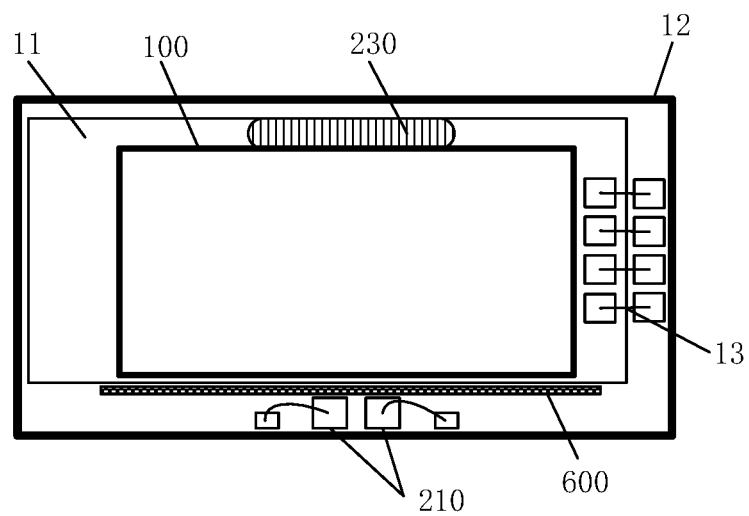
FIG. 6 is a schematic structural diagram of a fingerprint package according to the first embodiment of the present application.
Figure 7:
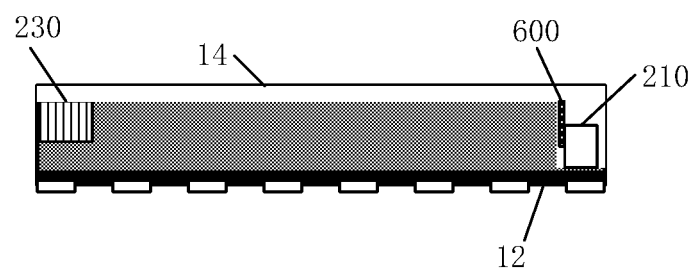
FIG. 7 is a cross-sectional view of the fingerprint package in FIG. 6.
Figure 8:
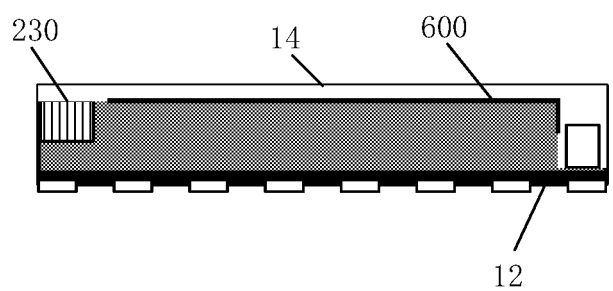
FIG. 8 is another cross-sectional view of the fingerprint package in FIG. 6.

The fingerprint package 10 may be as illustrated in FIGS. 6 to 8, the fingerprint sensor 100 and the optical module 200 are all packaged into one piece, including a substrate 12, and the optical emitter 210 and the fingerprint chip 11 deployed on the substrate 12. The optical circuit module 220, the photoelectric converter 230 and the fingerprint sensor 100 are integrated on the fingerprint chip 11, wherein a main central region is a fingerprint sensing region, and the substrate 12 is electrically connected to the fingerprint chip 11 via bonding wires 13.

Specifically, a light shading member is further disposed between the optical emitter 210 and the photoelectric converter 230, and is configured to block the light emitted by the optical emitter 210 from directly irradiating the photoelectric converter 230. The light shading member 600 has an absorption function or a power attenuation function for the light. Preferably, the light shading member 600 has a transmission rate of less than 1% for the light waves having a target wavelength, and further, a smaller transmission rate of the light shading member 600 is preferred. The light shading member 600 may be practiced in a plurality of manners. For example, such a light shading member may be practiced by adhering or coating a light absorbing material onto a surface (for example, a side surface or/and an upper surface, as illustrated in FIG. 7 and FIG. 8) of the fingerprint chip 11, or by making a slot on the fingerprint chip 11 and filling a light absorbing ink or glue in the slot.

In the present application, the light shading member is not a mandatory part. Whether a light shading member is needed is determined based on an actual distance between the optical emitter 210 and the photoelectric converter 230, as well as the strength of the light emitted by the optical emitter 210 and directly irradiating the photoelectric converter 230. Generally, if the strength of the light, which is emitted by the optical emitter 210 and directly irradiates the photoelectric converter 230, is less than 1% of the strength of the light, which is reflected by such a touch object as a finger and irradiates the photoelectric converter 230 via reflection by, the light shading member 600 may not be used.

Specifically, a protection layer 14 may also be provided on the surface of the fingerprint chip 11. The protection layer 14 is made from a light transmittable material, which is capable of not only protecting the fingerprint chip 11 but also satisfying the light transmission requirements at the upper portions of the optical emitter 210 and the photoelectric converter 230. Optionally, the upper portions of the optical emitter 210 and the photoelectric converter 230 may be made to be light transmittable only, whereas a non-light transmittable material may be used in other regions for protection.

When the fingerprint identification apparatus is assembled on the terminal device, for the sake of a better signal quality and use experience, the photoelectrical converter 230 is preferably disposed in the position close to the finger tip, and a connection line between the photoelectric converter 230 and the optical emitter 210 is parallel to an orientation of the touch object (for example, the finger) or an intersection angle therebetween is smaller. Described herein is a preferred recommended solution. In other assembling manner, the fingerprint identification apparatus may also normally work, but the signal quality and use experience are slightly different.

Figure 9:
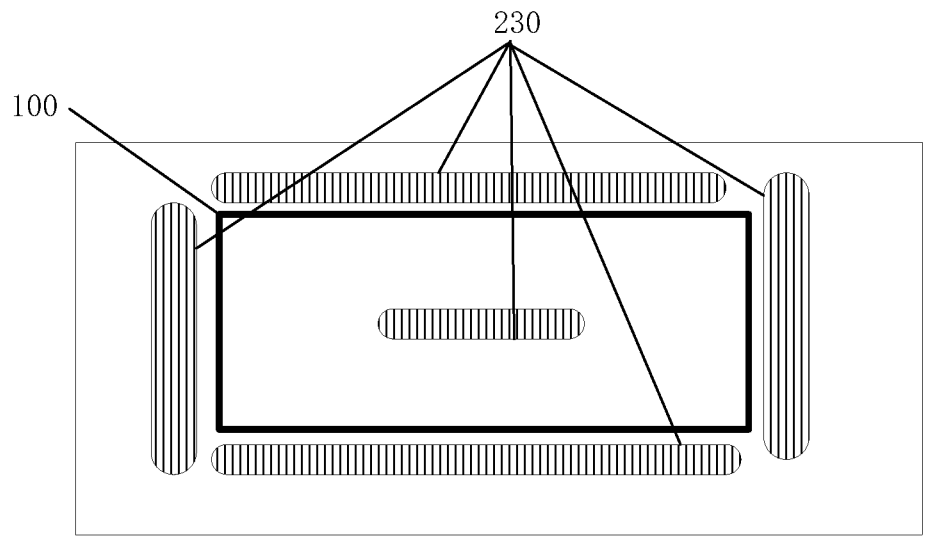
FIG. 9 is a schematic diagram of deployment of a photoelectric converter according to an embodiment of the present application.
Figure 10:
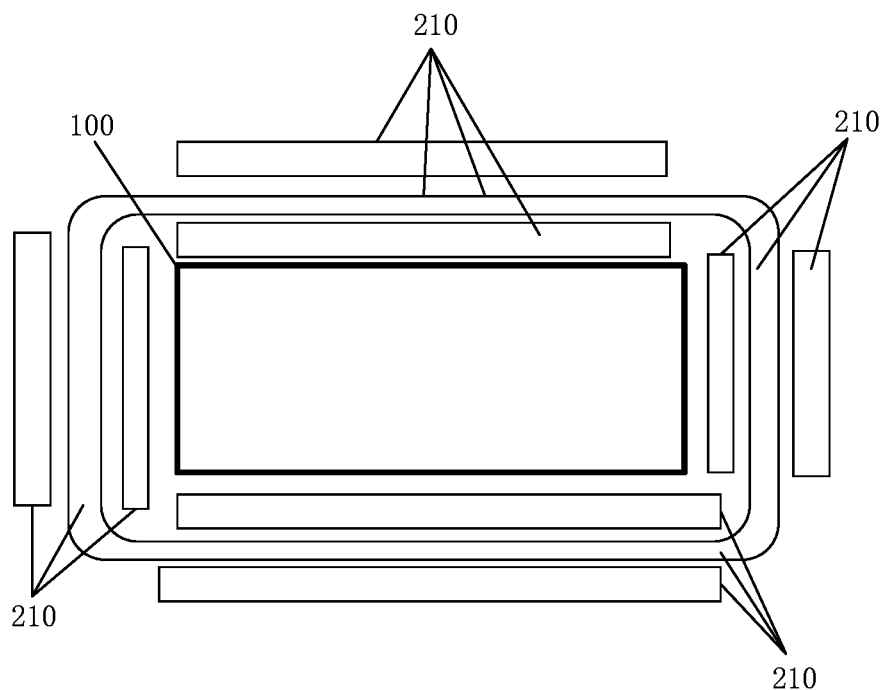
FIG. 10 is a schematic diagram of deployment of an optical emitter according to an embodiment of the present application.

Preferably, the photoelectric converter 230 and the optical emitter 210 are respectively deployed at two sides of a main central part of the fingerprint sensor 100, to ensure that when the finger presses the fingerprint sensing region, the finger is also capable of acting on the photoelectric converter 230 and the optical emitter 210, which facilitates live body detection in combination with the fingerprint image detection and also facilitates other application functions as optical pressure detection, heart detection and the like. Nevertheless, the photoelectric converter 230 and the optical emitter 210 may also be deployed in other manners. As illustrated in FIG. 9, the photoelectric converter 230 may be disposed in any position around the fingerprint sensor 100, or may be disposed at the main central part of the fingerprint sensor 100. In addition, one or a plurality of photoelectric converters 230 may be used. As illustrated in FIG. 10, the optical emitter 210 may be disposed in any position around the fingerprint sensor 100, or may be disposed to annularly surround the fingerprint sensor 100. In addition, one or a plurality of optical emitters 210 may be used.

A center-to-center distance between the photoelectric converter 230 and the optical emitter 210 is preferably between 3 mm and 10 mm, which is generally designed to 5 mm, such that the light received by the photoelectric converter 230 is the light that is emitted by the optical emitter 210 and then reflected back by the touch object. This reduces or even prevents, to the greatest extent, the light emitted by the optical emitter from directly irradiating the photoelectric converter 230. When the light directly irradiating the photoelectric converter 230 is strong, the light needs to be shaded by using the light shading member.

Figure 11:
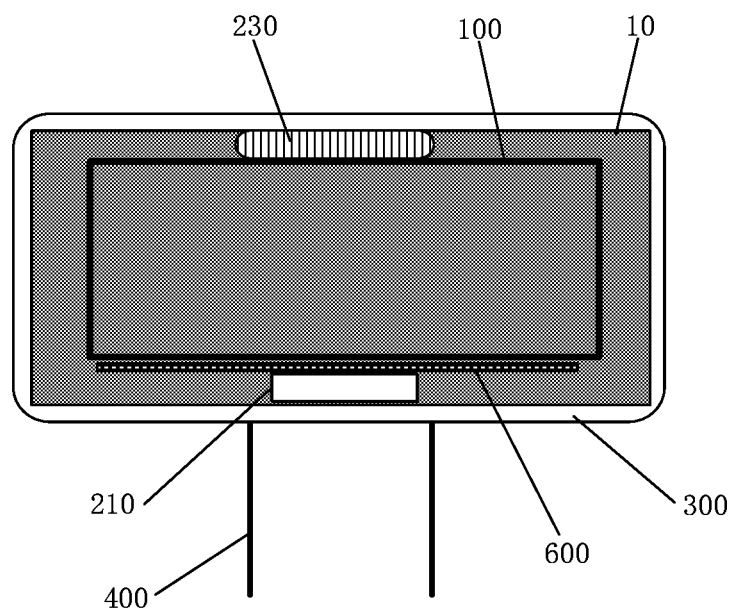
FIG. 11 is another structural diagram of the fingerprint identification apparatus according to the first embodiment of the present application.
Figure 12:
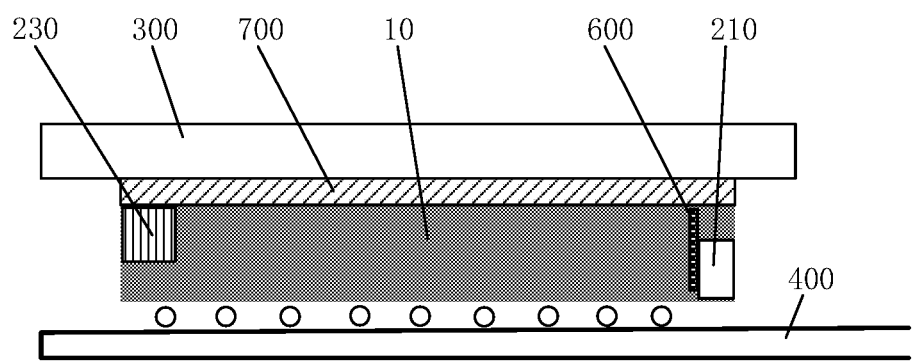
FIG. 12 is a cross-sectional view of the fingerprint identification apparatus in FIG. 11.
Figure 13:
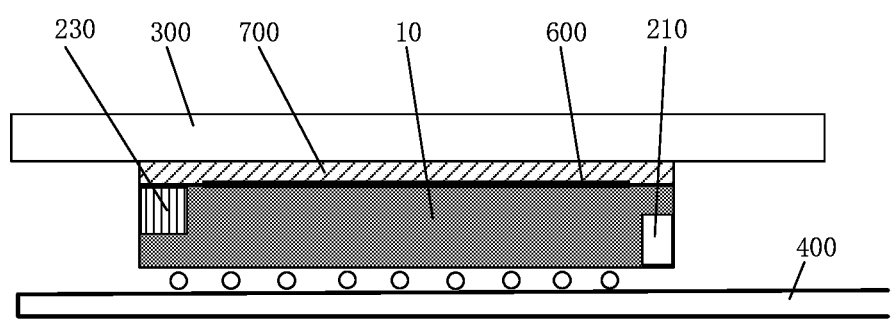
FIG. 13 is another cross-sectional view of the fingerprint identification apparatus in FIG. 11.

In the present application, the metal ring 500 is not a mandatory part. As illustrated in FIGS. 11 to 13, schematic structural diagrams of fingerprint identification apparatuses having no metal ring 500 are given. FIG. 11 is a plan view, FIG. 12 and FIG. 13 are cross-sectional views; in particular, FIG. 12 and FIG. 13 respectively illustrate two configurations for practicing the light shading member 600.

Figure 14:
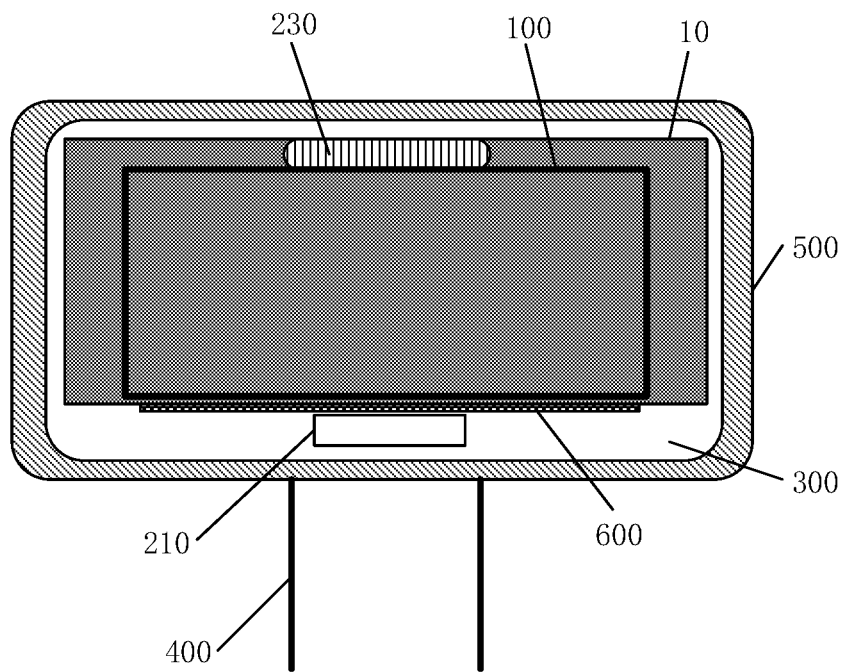
FIG. 14 is another structural diagram of the fingerprint identification apparatus according to the first embodiment of the present application.
Figure 15:
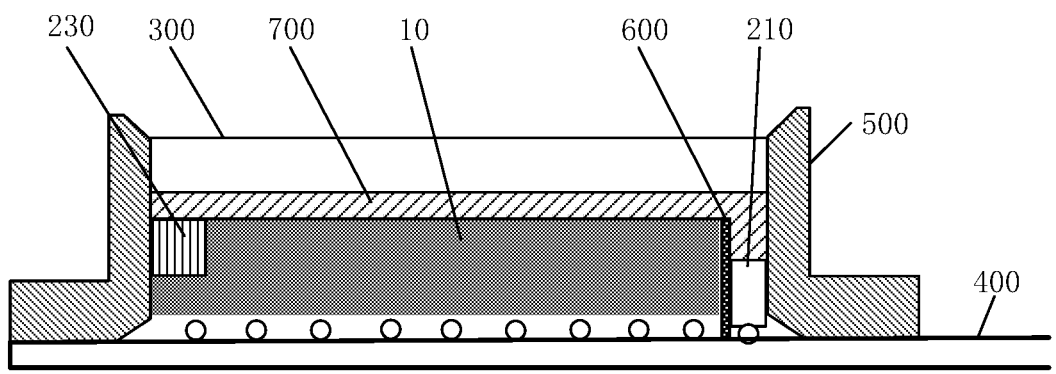
FIG. 15 is a cross-sectional view of the fingerprint identification apparatus in FIG. 14.
Figure 16:
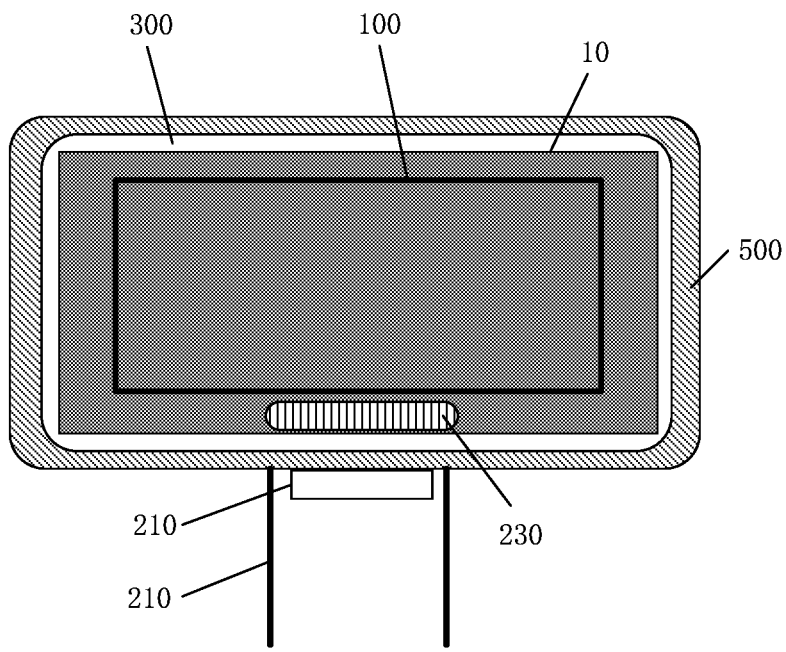
FIG. 16 is another structural diagram of the fingerprint identification apparatus according to the first embodiment of the present application.
Figure 17:
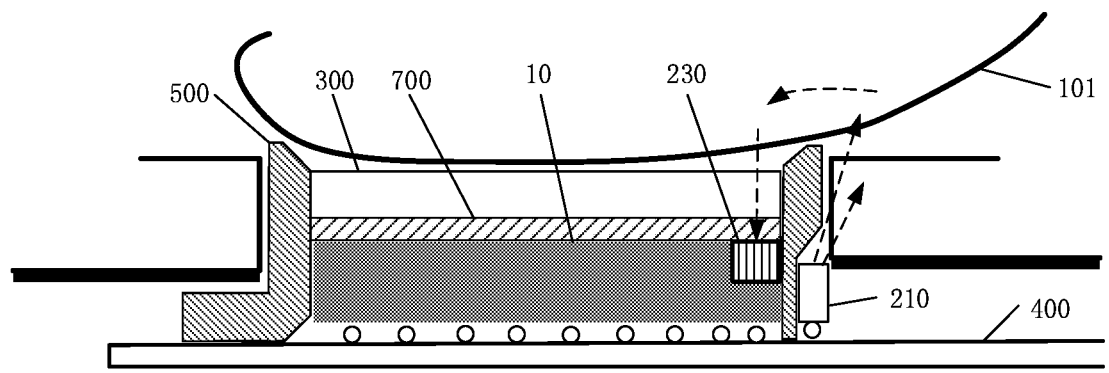
FIG. 17 is a cross-sectional view of the fingerprint identification apparatus in FIG. 16.

FIGS. 14 to 17 illustrate a second implementation of this embodiment. In this solution, the fingerprint chip 11 is independently packaged to form the fingerprint package 10, and in this structure, the fingerprint identification apparatus includes the fingerprint package 10, the cover plate 300, the metal ring 500 and the circuit board 400. The cover plate 300 and the fingerprint package 10 are disposed inside the metal ring 500. Since the optical emitter is a single device, the optical emitter 210 may be disposed inside the metal ring 500 (as illustrated in FIG. 14 and FIG. 15); alternatively, the optical emitter 210 may be disposed outside the metal ring (as illustrated in FIG. 16 and FIG. 17).

Figure 18:
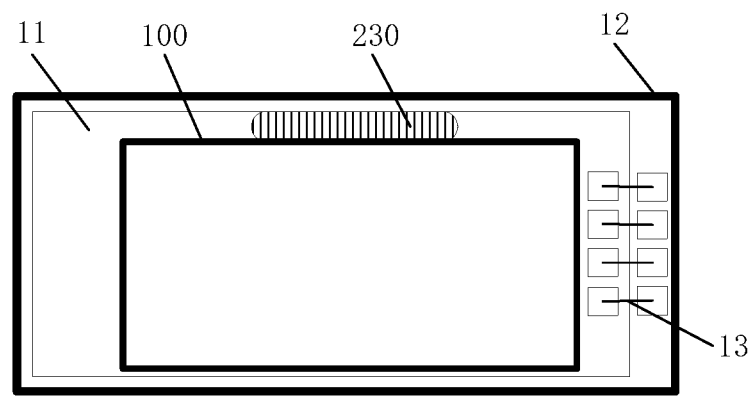
FIG. 18 is another schematic structural diagram of the fingerprint package according to the first embodiment of the present application.
Figure 19:
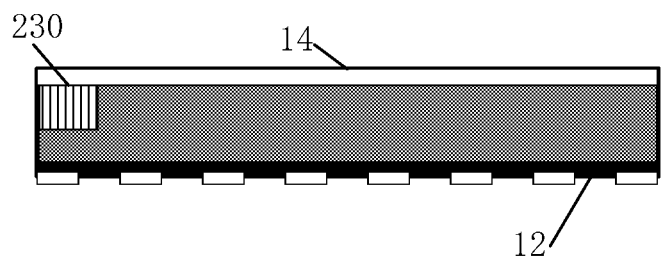
FIG. 19 is a cross-sectional view of the fingerprint package in FIG. 18.
Figure 20:
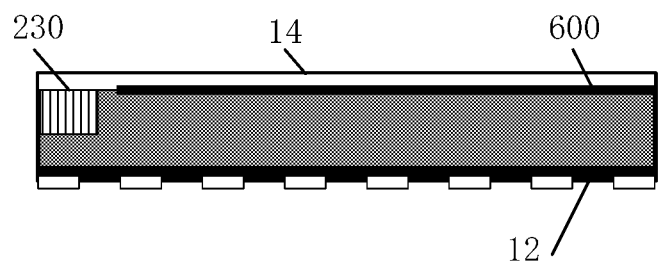
FIG. 20 is another cross-sectional view of the fingerprint package in FIG. 18.

The fingerprint package 10, as illustrated in FIGS. 18 to 20, includes the fingerprint chip 11 and the substrate 12, wherein the substrate 12 is electrically connected to the fingerprint chip 11 via the bonding wires 13, and the optical circuit module 220, the photoelectric converter 230 and the fingerprint sensor 100 are integrated on the fingerprint chip 11. Specifically, a protection layer 14 may also be provided on the surface of the fingerprint chip 11. Specifically, as illustrated in FIG. 20, the light shading member may also be disposed on the surface of the fingerprint chip 11. For example, a light absorbing material is adhered to or coated on the surface of the fingerprint chip 11. Nevertheless, in some embodiments, the light shading member (as illustrated in FIG. 19) may also be omitted. In the structures as illustrated in FIG. 16 and FIG. 17, the photoelectric converter 230 and the optical emitter 210 are respectively disclosed on an inner side and an outer side of the metal ring 500, and in this case the metal ring 500 is equivalent to the light shading member 600 disposed between the photoelectric converter 230 and the optical emitter 210. Therefore, the light shading member 600 does not need to be additionally disposed. The arrows denote the light that is emitted by the optical emitter 210 and reflected by the touch object 101.

Figure 21:
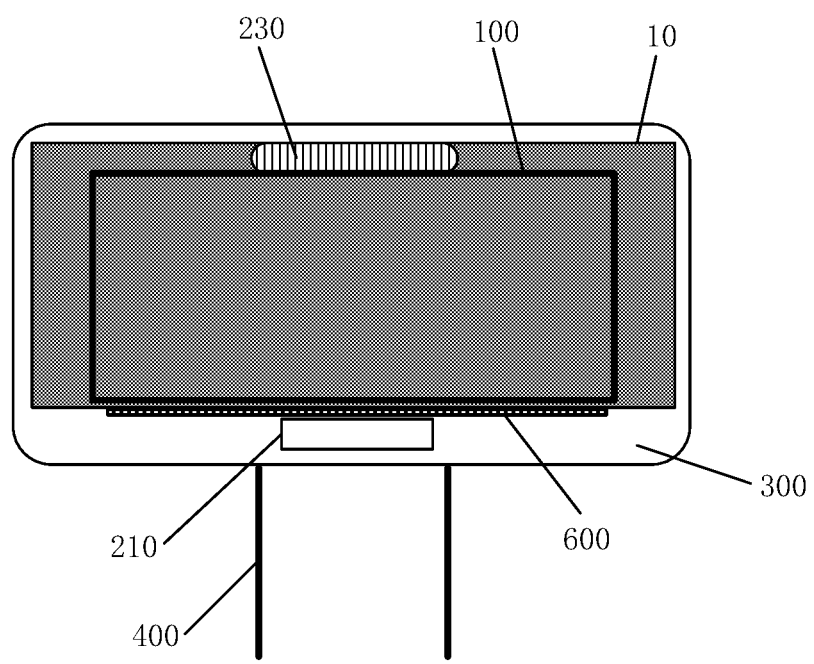
FIG. 21 is another structural diagram of the fingerprint identification apparatus according to the first embodiment of the present application.
Figure 22:
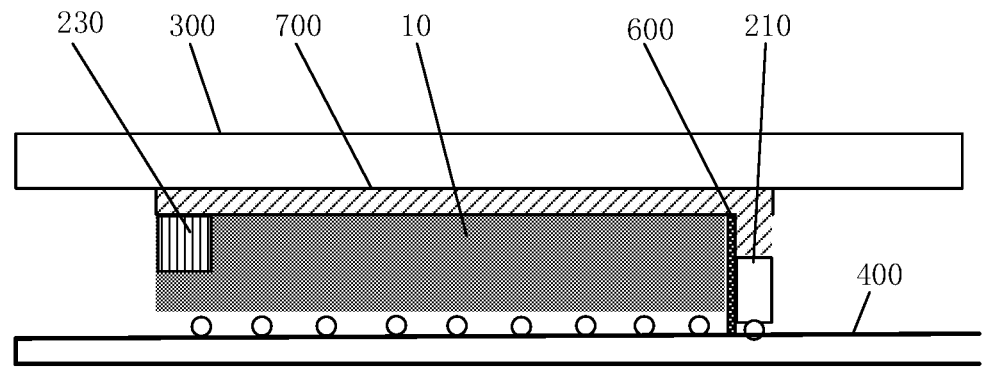
FIG. 22 is a cross-sectional view of the fingerprint identification apparatus in FIG. 21.
Figure 23:
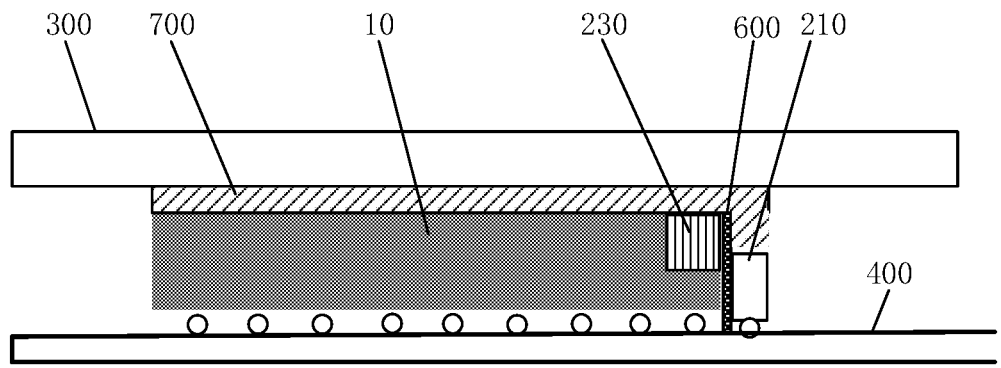
FIG. 23 is another cross-sectional view of the fingerprint identification apparatus in FIG. 21.
Figure 24:
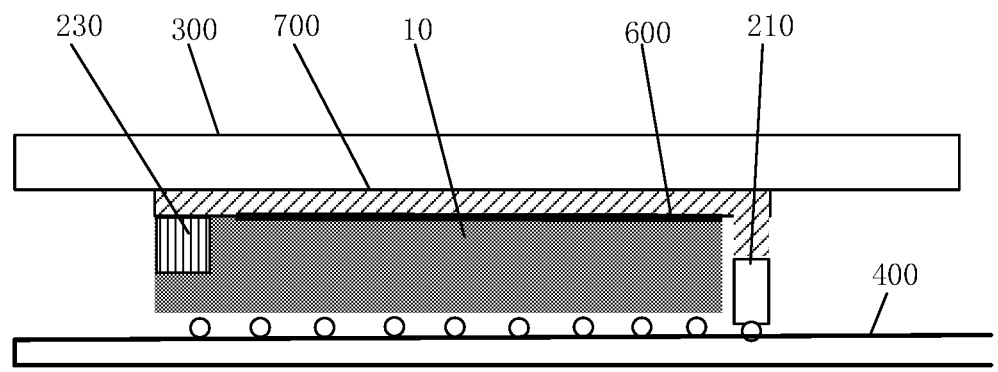
FIG. 24 is another cross-sectional view of the fingerprint identification apparatus in FIG. 21.

In some embodiments, the fingerprint identification apparatus may also be as illustrated in FIGS. 21 to 24, which has no metal ring 500. FIG. 21 is a plan view, and FIGS. 22 to 24 are cross-sectional views. In the configurations as illustrated in FIG. 22 and FIG. 23, the light shading member 600 is arranged in the same deployment structure while the photoelectric converter 230 is arranged in a different deployment structure; in the configurations as illustrated in FIG. 22 and FIG. 24, the light shading member 600 is arranged in a different deployment structure while the photoelectric converter 230 is arranged in the same deployment structure.

Figure 25:
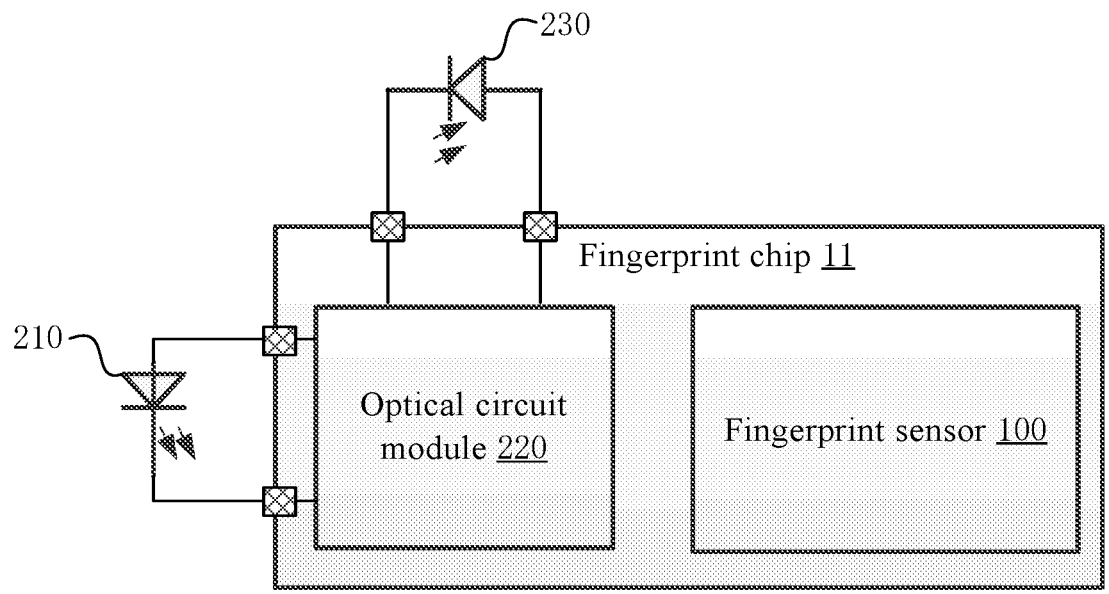
FIG. 25 is a diagram of circuit integration of a fingerprint identification apparatus according to a second embodiment of the present application.

As illustrated in FIG. 25, in this embodiment, the optical circuit module 220 and the fingerprint sensor 100 are integrated on a chip, wherein the chip is referred to as a fingerprint chip 11; moreover, the optical emitter 210 and the photoelectric converter 230 are each configured as an independent device. The fingerprint chip 11 may be packaged together with the optical emitter 210 and the photoelectric converter 230 to form the fingerprint package 10. The deployment structure in this integration manner is similar to that in the first implementation in the first embodiment, which is thus not described herein any further. The fingerprint chip 11 may also be packaged together with the photoelectric converter 230 to form the fingerprint package 10, whereas the optical emitter 210 is disposed outside the fingerprint package 10. The deployment structure in this integration manner is similar to that in the second implementation in the first embodiment, which is thus not described herein any further. The fingerprint chip 11 may also be independently packaged to form the fingerprint package 10, whereas the photoelectric converter 230 and the optical emitter 210 are disposed outside the fingerprint package 10. Hereinafter, the deployment structure of in this integration manner is described in detail.

Figure 26:
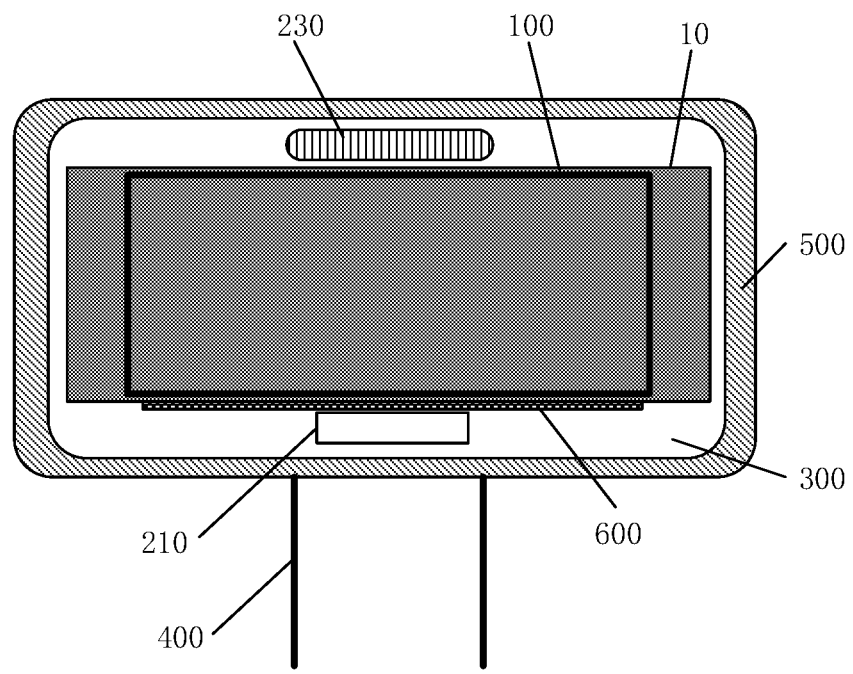
FIG. 26 is a structural diagram of the fingerprint identification apparatus according to the second embodiment of the present application.
Figure 27:
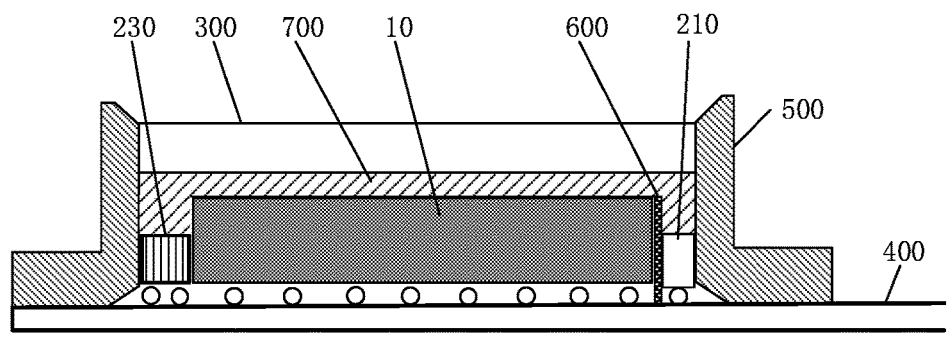
FIG. 27 is a cross-sectional view of the fingerprint identification apparatus in FIG. 26.

As illustrated in FIG. 26 and FIG. 27, the fingerprint identification apparatus includes the fingerprint package 10, the optical emitter 210, the photoelectric converter 230, the cover plate 300, the metal ring 500 and the circuit board 400. The cover plate 300, the fingerprint package 10, the optical emitter 210 and the photoelectric converter 230 are all disclosed inside the metal ring 500; the optical emitter 210 and the photoelectric converter 230 are respectively disposed on two sides of the fingerprint package 10, and the light shading member 600 is disposed between the optical emitter 210 and the photoelectric converter 230.

Figure 28:
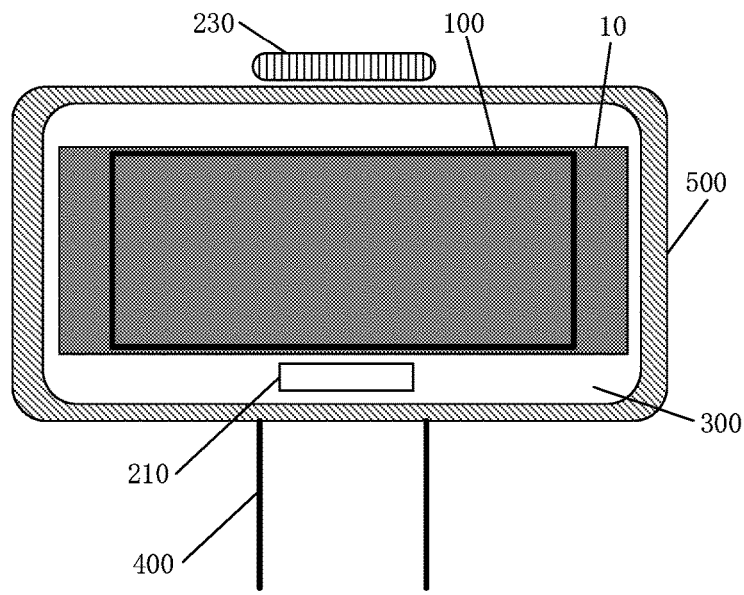
FIG. 28 is another structural diagram of the fingerprint identification apparatus according to the second embodiment of the present application.
Figure 29:
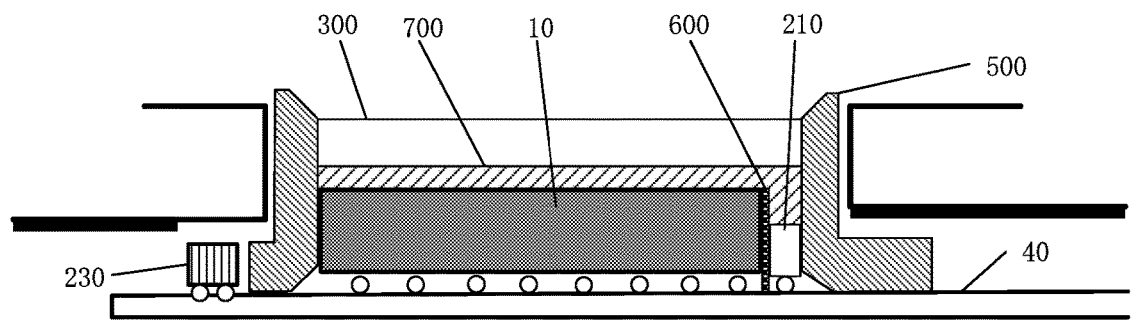
FIG. 29 is a cross-sectional view of the fingerprint identification apparatus in FIG. 28.
Figure 30:
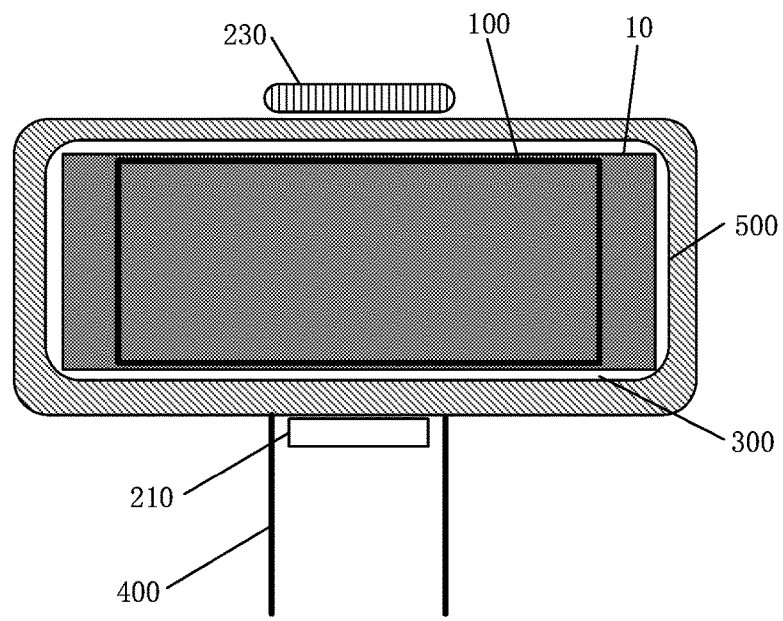
FIG. 30 is another structural diagram of the fingerprint identification apparatus according to the second embodiment of the present application.
Figure 31:
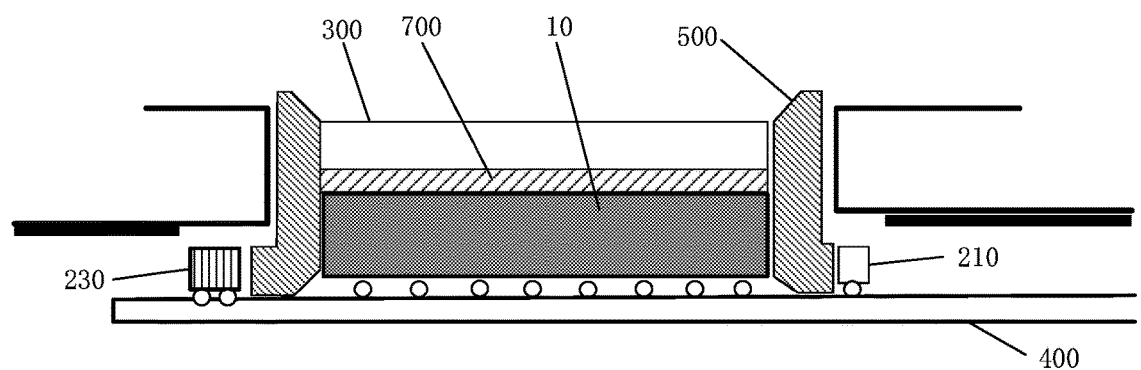
FIG. 31 is a cross-sectional view of the fingerprint identification apparatus in FIG. 30.

Since the photoelectric converter 230 and the optical emitter 210 are independent devices, the optical emitter 210 and the photoelectric converter 230 may be, as illustrated in FIG. 28 and FIG. 29, respectively disposed on the inner side and the outer side (or on the outer side and the inner side) of the metal ring 500, or the optical emitter 210 and the photoelectric converter 230 may be, as illustrated in FIG. 30 and FIG. 31, both disposed outside the metal ring 500. In this deployment structure, the metal ring 500 is equivalent to the light shading member 600 disposed between the optical emitter 210 and the photoelectric converter 230, and therefore, the light shading member 600 does not need to be additionally disposed.

Figure 32:
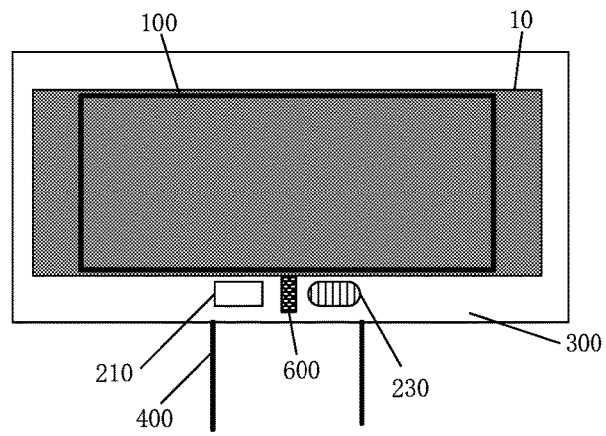
FIG. 32 is another structural diagram of the fingerprint identification apparatus according to the second embodiment of the present application.
Figure 33:
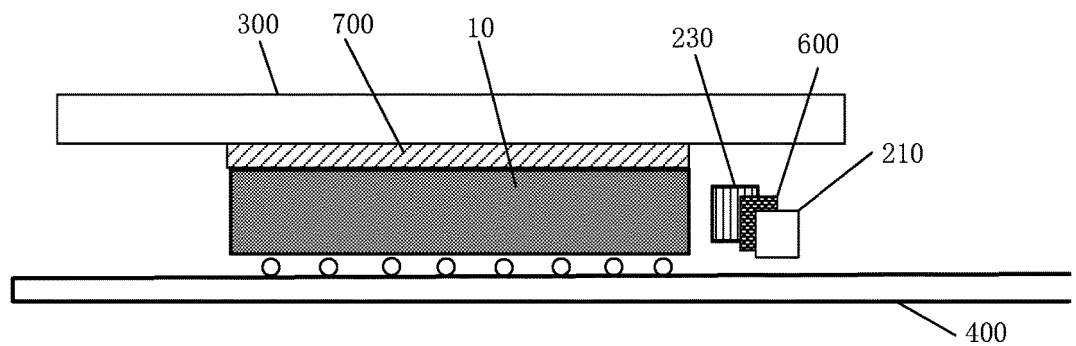
FIG. 33 is a cross-sectional view of the fingerprint identification apparatus in FIG. 32.

In some embodiments, the fingerprint identification apparatus may not employ the metal ring 500 (as illustrated in FIG. 32 and FIG. 33). Specifically, the optical emitter 210 and the photoelectric converter 230 may also be, as illustrated in FIG. 32 and FIG. 33, disposed on the same side of the fingerprint package 10 to be adjacent to each other. In this case, a light shading member 600 needs to be disposed between the optical emitter 210 and the photoelectric converter 230.

Figure 34:
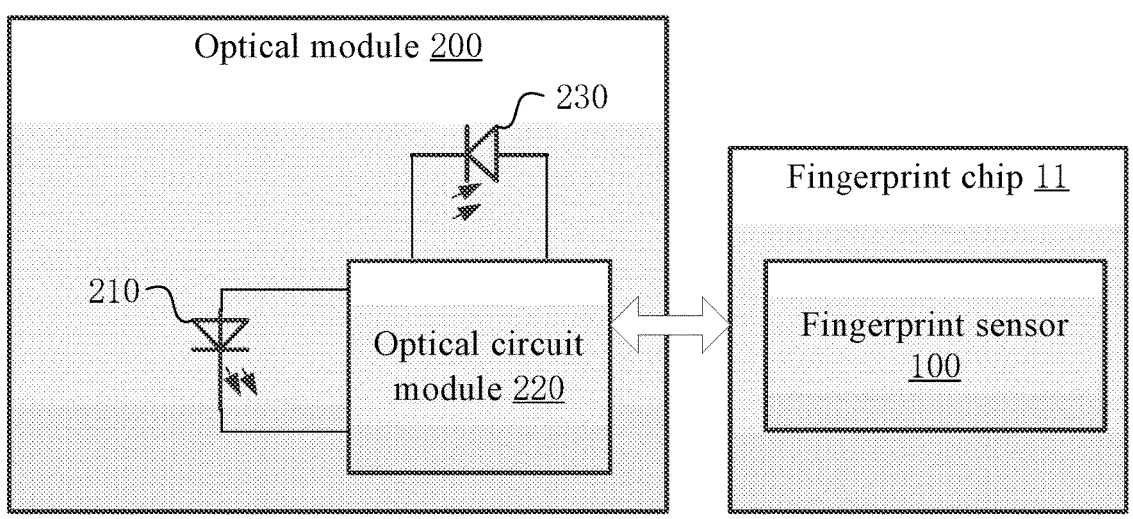
FIG. 34 is a diagram of circuit integration of a fingerprint identification apparatus according to a third embodiment of the present application.

As illustrated in FIG. 34, in this embodiment, the fingerprint sensor 100 is independently integrated on a chip, the chip is referred as the fingerprint chip 11; and moreover, the optical circuit module 220 is electrically connected to the fingerprint sensor 100 via a data interface, wherein the data interface may be a serial peripheral interface (SPI), an inter-integrated circuit (I2C), a universal asynchronous receiver/transmitter (UART) interface, a universal serial bus (USB) interface or the like. Any two or all of the optical emitter 210, the photoelectric converter 230 and the optical circuit module 220 may be combined to form an integrated chip or combined to form an integral package; alternatively, the optical emitter 210, the photoelectric converter 230 and the optical circuit module 220 may be individual independent devices.

Figure 35:
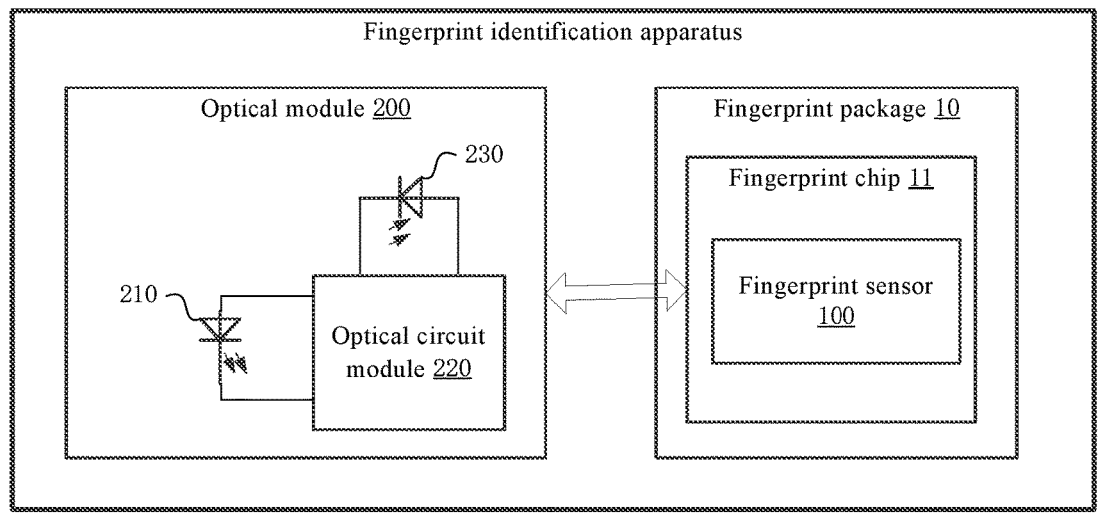
FIG. 35 is a structural diagram of the fingerprint identification apparatus according to the third embodiment of the present application.

As illustrated in FIG. 35, the fingerprint chip 11 is independently packaged to form the fingerprint package 10; the photoelectric converter 230 and the optical emitter are integrated to form a single optical module 200, and the optical module 200 is electrically connected to the fingerprint package 10 via a data interface.

Figure 36:
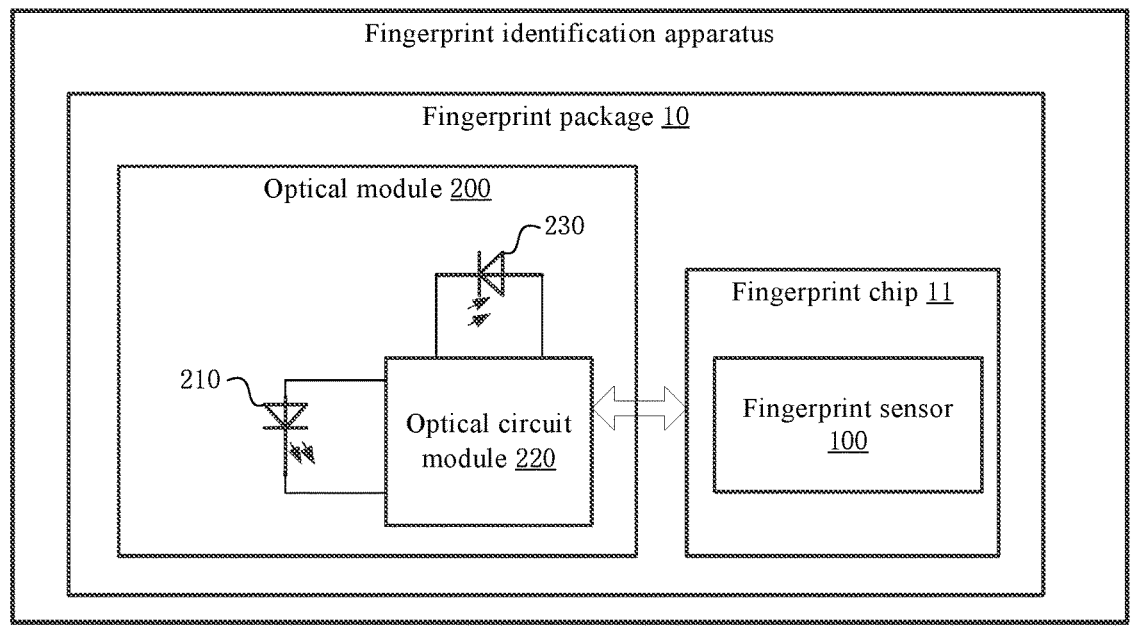
FIG. 36 is another structural diagram of the fingerprint identification apparatus according to the third embodiment of the present application.

As illustrated in FIG. 36, the optical module 200 formed by the optical circuit module 220, the photoelectric converter 230 and the optical emitter 210 is packaged together with the fingerprint chip 11 to form the fingerprint package 10.

Figure 37:
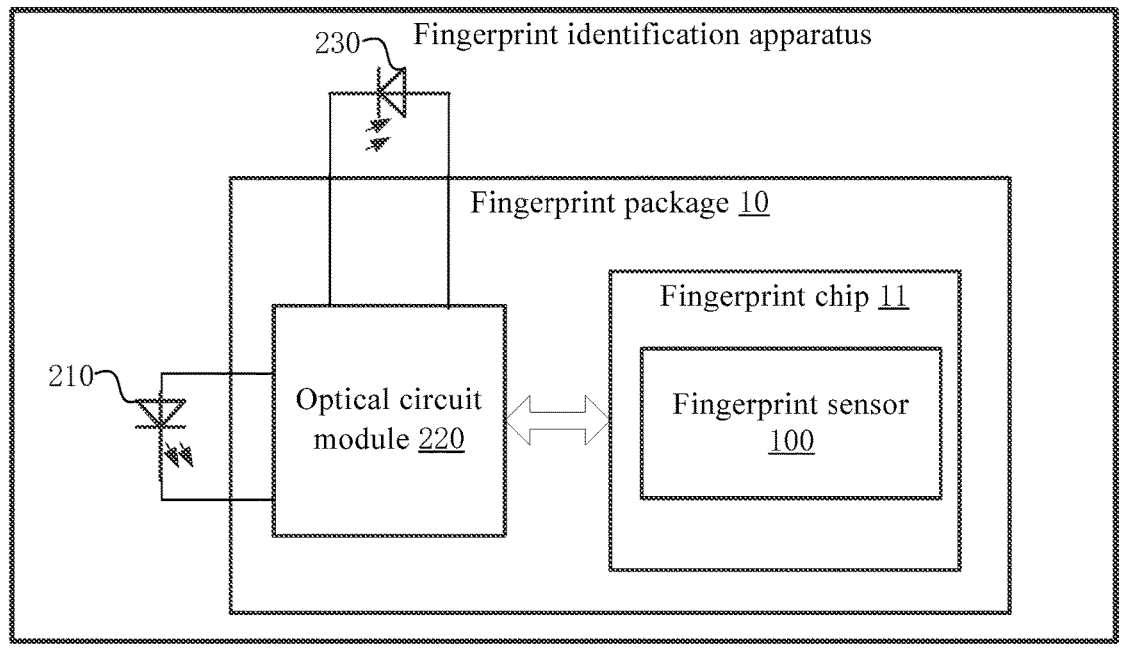
FIG. 37 is another structural diagram of the fingerprint identification apparatus according to the third embodiment of the present application.

As illustrated in FIG. 37, the optical circuit module 220 is packaged together with the fingerprint chip 11 to form the fingerprint package 10; the photoelectric converter 230 and the optical emitter 210 are disposed outside the fingerprint package 10.

It should be understood that the deployment structure solution of the optical emitter 210 and the photoelectric converter 230 as described in the above embodiments is also applicable to this embodiment, which is thus not described herein any further.

Figure 38:
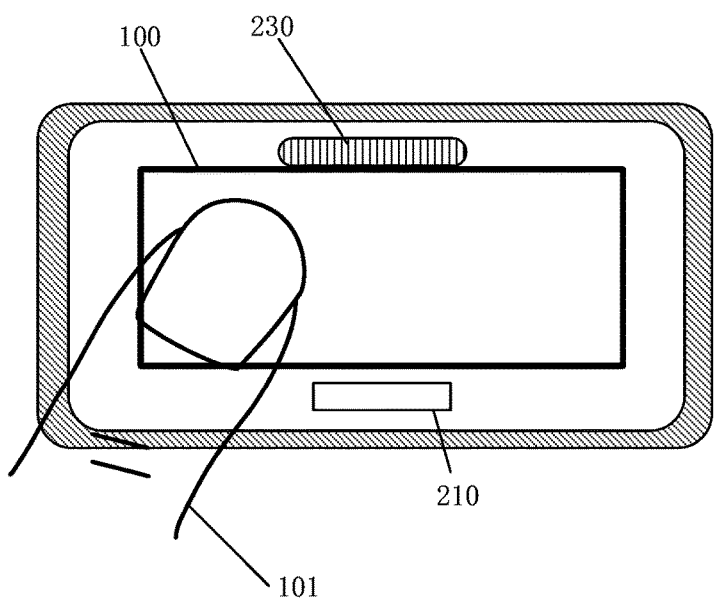
FIG. 38 is a schematic diagram of fingerprint identification performed by the fingerprint identification apparatus according to an embodiment of the present application.
Figure 39:
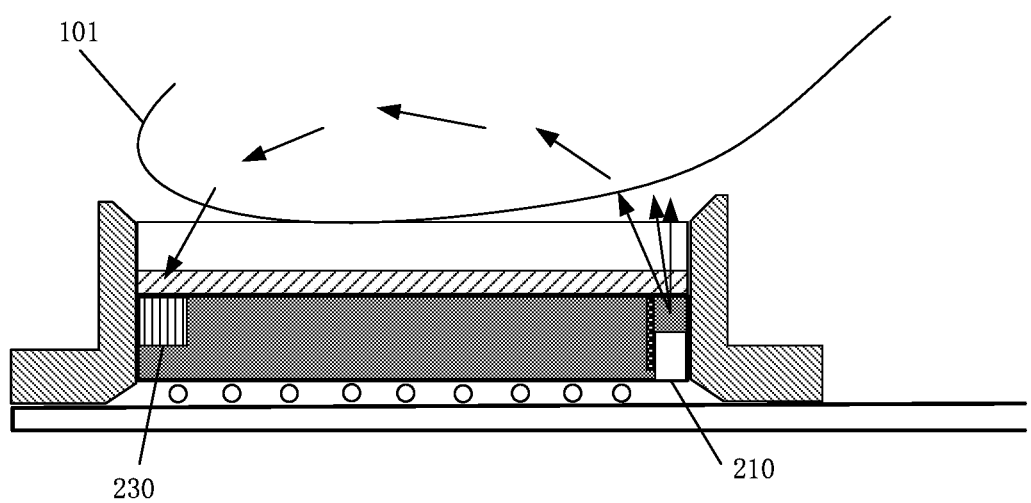
FIG. 39 is a cross-sectional view of the fingerprint identification apparatus in FIG. 38.

FIG. 38 and FIG. 39 schematically illustrate fingerprint identification performed by using the fingerprint identification apparatus according to present application. FIG. 38 is a plan view of the fingerprint identification apparatus, and FIG. 39 is a cross-sectional view of the fingerprint identification apparatus. FIG. 38 illustrates a scenario where the touch object 101 (for example, the finger) is to touch the fingerprint identification apparatus, and FIG. 39 illustrates a scenario where the touch object 101 has touched the fingerprint sensor 100 of the fingerprint identification apparatus. The arrows denote the process in which the light emitted by the optical emitter 210 irradiates the photoelectric converter 230 via reflection by the touch object 101.

In the fingerprint identification apparatus according to the present application, the optical module 200 and the fingerprint sensor 100 are integrated on the fingerprint identification apparatus, when the touch object 101 (for example, a finger) touches the fingerprint sensor 100, such a touch also acts on the optical emitter 210 and the photoelectric converter 230 of the optical module 200. In this way, a fingerprint signal and an optical signal of the finger are may be simultaneously collected, which implements the live body detection function (that is, determining whether the detected object is an authentic fingerprint), lowers the risk that the fingerprint identification apparatus is cracked by a spoof fingerprint, and improves the security.

In addition, the optical module 200 may also implement such functions as heart rate detection, touch pressure detection, key detection, blood oxygen detection, blood pressure monitoring and the like, and thus extends functionality of the mobile terminal. According to the present application, the optical module 200 is integrated in the fingerprint identification apparatus to implement such functions as heart rate detection and the like. As compared with the mobile terminal in which a heart rate identification module is independently disposed to detect the heart rate, the design according to the present application has the advantages of simple structure, low cost and convenient use.

Figure 40:
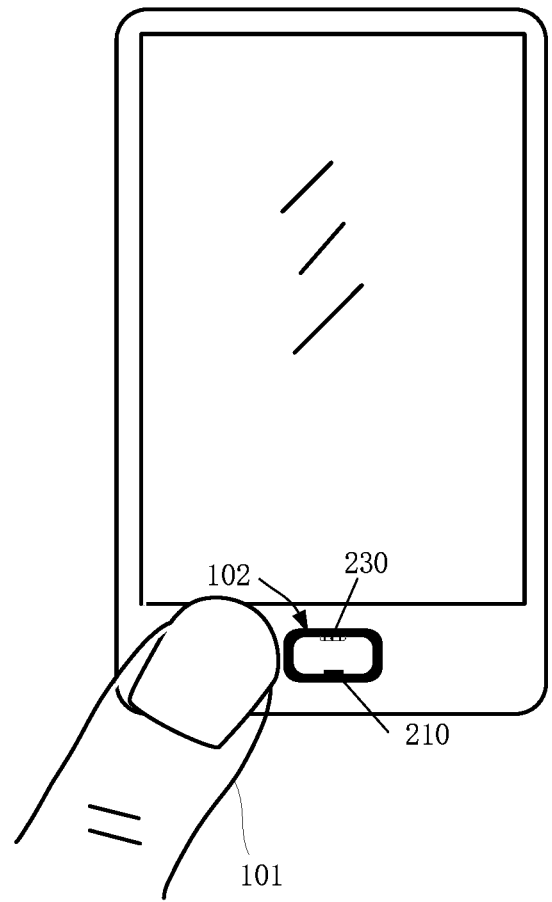
FIG. 40 is a schematic structural diagram of a mobile terminal according to an embodiment the present application.

Referring to FIG. 40, the present application further provides a mobile terminal. The mobile terminal includes a fingerprint identification apparatus 102. The fingerprint identification apparatus 102 includes a fingerprint sensor and an optical module electrically connected to the fingerprint sensor, wherein the optical module includes an optical emitter 210, an optical circuit module and a photoelectric converter 230. The optical circuit module is electrically connected to the optical emitter 210 and the photoelectric converter 230 respectively. The optical emitter 210 is configured to emit an optical signal having a specific wavelength; the photoelectric converter 230 is configured to receive the optical signal emitted by the optical emitter 210 and subjected to an effect of a touch object 101, and converts the optical signal into an electric signal; the optical circuit module is configured to drive and control the optical emitter 210, and analyze and process the electric signal. The fingerprint identification apparatus 102 described in this embodiment is the fingerprint identification apparatus 102 involved in the above embodiments of the present application, which is thus not described herein any further. In this embodiment, the fingerprint identification apparatus 102 is disposed at the Home key of a mobile terminal. In other embodiments, the fingerprint identification apparatus 102 may also be disposed in other positions of the mobile terminal, for example, on a side or back of the mobile terminal.

In the mobile terminal according to the present application, the optical module and the fingerprint sensor are integrated on the fingerprint identification apparatus, when the touch object (for example, a finger) touches the fingerprint sensor, such a touch also acts on the optical emitter and the photoelectric converter of the optical module. In this way, a fingerprint signal and an optical signal of the finger are may be simultaneously collected, which implements the live body detection function (that is, determining whether the detected object is an authentic fingerprint), lowers the risk that the fingerprint identification apparatus is cracked by a spoof fingerprint, and improves the security.

In addition, the optical module may also implement such functions as heart rate detection, touch pressure detection, key detection, blood oxygen detection, blood pressure monitoring and the like, and thus extends functionality of the mobile terminal. According to the present application, the optical module is integrated in the fingerprint identification apparatus to implement such functions as heart rate detection and the like. As compared with the mobile terminal in which a heart rate identification module is independently disposed to detect the heart rate, the design according to the present application has the advantages of simple structure, low cost and convenient use.

The preferred embodiments of the present application are described with reference to the accompanying drawings, but the scope of the present application is not limited to such embodiments. A person skilled in the art would derive various modifications or variations to practice the present application without departing from the scope and essence of the present application. For example, the features disclosed in one embodiment may be used to another embodiment to derive still another embodiment. Any modifications, equivalent replacements and improvements made within the technical concept of the present application shall fall within the scope defined by the claims of the present application.

In the description of the present application, it should be understood that the terms "upper", "lower" and the like indicate orientations and position relationships which are based on the illustrations in the accompanying drawings, and these terms are merely for ease and brevity of the description, instead of indicating or implying that the apparatuses or elements shall have a particular orientation and shall be structured and operated based on the particular orientation. Accordingly, these terms shall not be construed as limiting the present application.

In addition, terms of "first", "second" are only used for description, but shall not be understood as indication or implication of relative importance or implicit indication of the number of the specific technical features. Therefore, the features defined by the terms "first" and "second" may explicitly or implicitly include one or more of these features. In the description of the present application, the term "more" or "a plurality of" signifies at least two, unless otherwise specified.

In the description of the present specification, reference terms such as "an embodiment", "some embodiments", "examples", "specific examples", "some examples", or the like are intended to refer to that the specific features, structures, materials, or characteristics which are described in combination with the embodiments or examples are included in at least one embodiment or example of the present application. In this specification, schematic expressions of the above terms do not necessarily indicate the same embodiments or examples. In addition, the described specific features, structures, materials, or characteristics may be combined in any one or multiple embodiments or examples in a suitable way. In addition, in case of no contradiction, a person skilled in the art may incorporate or combine different embodiments or examples and features of different embodiments or examples described in this specification.

Although the embodiments of the present application are described in detail above, persons or ordinary skill in the art may understand that without departing from the principle and intention of the present application, various variations, modifications and replacements may be made to these embodiments, and the scope of the present application is defined by the appended claims and their equivalents.

In the several embodiments provided in the present application, it should be understood that the disclosed apparatus and method may be practiced in other manners. The above described apparatus embodiments are merely illustrative. For example, the module division is merely logical function division and may be other divisions in actual practice. For example, multiple modules or components may be combined or integrated into another device, or some features can be ignored or not performed. In addition, the displayed or discussed mutual couplings or direct couplings or communication connections may be implemented through some interfaces. The indirect couplings or communication connections between the apparatuses or modules may be implemented in electronic, mechanical or other forms.

The units which are described as separate modules may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments.

In addition, functional modules in the embodiments of the present application may be integrated into one processing module, or each of the modules may exist along physically, or two or more modules may be integrated into one module. The above integrated module may be implemented by using hardware, and may also be implemented by using a software function module.

If the integrated module is implemented by using the software function module, and is sold or used as an independent product, the integrated module may also be stored in a computer readable storage medium. Based on such an understanding, the technical solutions of the present application essentially, or the part contributing to the related art, or all or a part of the technical solutions may be implemented in a form of a software product. The computer software product is stored in a storage medium and includes several instructions to cause a computer device (which may be a personal computer, a server, a network device, or the like) to perform all or some of steps of the methods described in the embodiments of the present application. The storage medium includes various media capable of storing program code, for example, a USB flash disk, a removable hard disk, a read-only memory (ROM), a random access memory (RAM), a magnetic disk, or an optical disc.

It should be noted that, with respect to the above described method embodiments, for brevity of description, the actions or steps are all described as a series of action combinations. However, a person skilled in the art shall understand that the embodiments of the present application are not subjected to limitations of the action sequences described above. Further, based on the embodiments of the present application, some steps may be performed in another or other sequences or may be simultaneously performed. In addition, a person skilled in the art should also know that the embodiments described in the description herein are all preferred embodiments, and all the involved actions and modules are not mandatory ones of the embodiments of the present application.

In the above embodiments, descriptions give different particular emphases to various embodiments, and the portion of some embodiment that is not described may be referenced to the relevant description in other embodiments.

What is claimed is:

1. A fingerprint identification apparatus, comprising:
a fingerprint sensor,
an optical module electrically connected to the fingerprint sensor, wherein the optical module comprises an optical emitter, an optical circuit module and a photoelectric converter; wherein the optical circuit module is electrically connected to the optical emitter and the photoelectric converter respectively, and
a light shading member disposed between the optical emitter and the photoelectric converter, wherein the light shading member is configured to block a light emitted by the optical emitter from directly irradiating the photoelectric converter, the light shading member is a light absorbing material adhered to or coated on a surface of a fingerprint chip; or a light absorbing ink or glue filled in a slot of the fingerprint chip;
wherein,
the optical emitter is configured to emit an optical signal having a specific wavelength;
the photoelectric converter is configured to receive the optical signal emitted by the optical emitter and subjected to a touch object, and convert the optical signal into an electric signal; and
the optical circuit module is configured to drive and control the optical emitter, and analyze the electric signal.

2. The fingerprint identification apparatus according to claim 1, wherein the optical circuit module and the fingerprint sensor are integrated on the fingerprint chip.

3. The fingerprint identification apparatus according to claim 2, wherein the fingerprint chip and the optical emitter are packaged together with the photoelectric converter to form a fingerprint package.

4. The fingerprint identification apparatus according claim 3, further comprising a metal ring, wherein the fingerprint sensor and the optical module are both disposed inside the metal ring.

5. The fingerprint identification apparatus according to claim 2, wherein the fingerprint chip is packaged together with the photoelectric converter to form a fingerprint package.

6. The fingerprint identification apparatus according to claim 5, further comprising a metal ring; wherein
the fingerprint sensor and the optical module are both disposed inside the metal ring; or
the fingerprint sensor, the optical circuit module and the photoelectric converter are disposed inside the metal ring, while the optical emitter is disposed outside the metal ring.

7. The fingerprint identification apparatus according to claim 2, wherein the fingerprint chip is independently packaged to form a fingerprint package.

8. The fingerprint identification apparatus according to claim 7, further comprising a metal ring; wherein
the fingerprint sensor and the optical module are both disposed inside the metal ring; or
the fingerprint sensor, the optical circuit module and the photoelectric converter are disposed inside the metal ring, while the optical emitter is disposed outside the metal ring; or
the fingerprint sensor, the optical circuit module and the optical emitter are disposed inside the metal ring, while the photoelectric converter is disposed outside the metal ring; or
the fingerprint sensor and the optical circuit module are disposed inside the metal ring, while the photoelectric converter and the optical emitter are disposed outside the metal ring.

9. The fingerprint identification apparatus according to claim 1, wherein the fingerprint sensor is independently integrated on the fingerprint chip, and the optical circuit module is electrically connected to the fingerprint sensor via a data interface.

10. The fingerprint identification apparatus according to claim 9, wherein the fingerprint chip is independently packaged to form a fingerprint package.

11. The fingerprint identification apparatus according to claim 9, wherein the fingerprint chip is packaged together with the optical module to form a fingerprint package.

12. The fingerprint identification apparatus according to claim 9, wherein the fingerprint chip is packaged together with the optical circuit module to form a fingerprint package.

13. The fingerprint identification apparatus according to claim 1, wherein the optical circuit module, the photoelectric converter and the fingerprint sensor are integrated on the fingerprint chip.

14. The fingerprint identification apparatus according to claim 13, wherein the fingerprint chip is packaged together with the optical emitter to form a fingerprint package.

15. The fingerprint identification apparatus according claim 14, further comprising a metal ring, wherein the fingerprint sensor and the optical module are both disposed inside the metal ring.

16. The fingerprint identification apparatus according to claim 13, wherein the fingerprint chip is singly packaged to form a fingerprint package.

17. The fingerprint identification apparatus according to claim 16, further comprising a metal ring; wherein
the fingerprint sensor and the optical module are both disposed inside the metal ring; or
the fingerprint sensor, the optical circuit module and the photoelectric converter are disposed inside the metal ring, while the optical emitter is disposed outside the metal ring.

18. A mobile terminal, comprising a fingerprint identification apparatus; wherein the fingerprint identification apparatus comprises:
a fingerprint sensor,
an optical module electrically connected to the fingerprint sensor; the optical module comprises an optical emitter, an optical circuit module and a photoelectric converter; the optical circuit module is electrically connected to the optical emitter and the photoelectric converter respectively, and
a light shading member disposed between the optical emitter and the photoelectric converter, wherein the light shading member is configured to block the light emitted by the optical emitter from directly irradiating the photoelectric converter, the light shading member is a light absorbing material adhered to or coated on a surface of a fingerprint chip; or a light absorbing ink or glue filled in a slot of the fingerprint chip;

wherein,
- the optical emitter is configured to emit a first optical signal, and the optical signal is subjected to a touch object to form a second optical signal;
- the photoelectric converter is configured to receive the second optical signal, and convert the second optical signal into an electric signal; and
- the optical circuit module is configured to drive the optical emitter, and analyze the electric signal to determine whether the touch object is a live body.

* * * * *